United States Patent
Nomura (10) Patent No.: US 11,995,282 B2
(45) Date of Patent: May 28, 2024

(54) TOUCH STATE DETECTION CIRCUIT, ELECTRONIC DEVICE INCLUDING TOUCH STATE DETECTION CIRCUIT, AND TOUCH STATE DETECTION METHOD

(71) Applicant: Wacom Co., Ltd., Saitama (JP)

(72) Inventor: Yoshio Nomura, Saitama (JP)

(73) Assignee: Wacom Co., Ltd., Saitama (JP)

(*) Notice: Subject to any disclaimer, the term of this patent is extended or adjusted under 35 U.S.C. 154(b) by 0 days.

(21) Appl. No.: 17/979,651

(22) Filed: Nov. 2, 2022

(65) Prior Publication Data
US 2023/0152931 A1 May 18, 2023

(30) Foreign Application Priority Data
Nov. 18, 2021 (JP) ................. 2021-187524

(51) Int. Cl.
*G06F 3/044* (2006.01)
*G06F 3/041* (2006.01)

(52) U.S. Cl.
CPC ........ *G06F 3/0446* (2019.05); *G06F 3/04166* (2019.05); *G06F 2203/04104* (2013.01); *G06F 2203/04106* (2013.01)

(58) Field of Classification Search
CPC .............. G06F 3/04166; G06F 3/0446; G06F 2203/04104; G06F 2203/04106
See application file for complete search history.

(56) References Cited

U.S. PATENT DOCUMENTS

| | | | | |
|---|---|---|---|---|
| 11,209,938 B2* | 12/2021 | Nomura | ............. | G06F 3/04186 |
| 2020/0333939 A1* | 10/2020 | Nomura | ................. | G06F 3/044 |
| 2021/0184675 A1* | 6/2021 | Yamada | .................. | G01D 5/24 |
| 2022/0113856 A1* | 4/2022 | Nomura | ............. | G06F 3/04162 |

FOREIGN PATENT DOCUMENTS

JP 2020177591 A 10/2020

* cited by examiner

*Primary Examiner* — Michael Pervan
(74) *Attorney, Agent, or Firm* — Seed IP Law Group LLP (57) ABSTRACT

Disclosed herein is a touch state detection circuit which is connected to a capacitance-type touch sensor including sensor electrodes disposed in a planar manner and which detects a touch state of a user by executing a scan process that reads out and processes detection signals sequentially output from the sensor electrodes. The touch state detection circuit includes a setting circuit which sets a scan condition related to an execution frequency of the scan process or an execution period of the scan process, and a detection circuit which detects the touch state by executing the scan process under the scan condition set by the setting circuit. When a determination condition indicating a situation in which the scan condition is required to be changed is satisfied, the setting circuit changes and resets the scan condition, and the detection circuit detects the touch state under the scan condition reset by the setting circuit.

14 Claims, 9 Drawing Sheets

| CONDITION NAME | CONDITION ID | DETERMINATION CONDITION | TOUCH EXECUTION PERIOD |
|---|---|---|---|
| FIRST CONDITION | 1 | NUMBER OF FINGERS IS SMALL | SHORTEN |
| | 2 | PALM REGION HAS BEEN DETECTED | SHORTEN |
| | 3 | MOVING SPEED OF FINGER IS LOW | SHORTEN |
| | 4 | SIZE OF TOUCH SENSOR IS SMALL | SHORTEN |
| | 5 | REFRESH RATE OF DISPLAY PANEL IS HIGH | SHORTEN |
| | 6 | THERE IS PARTIAL REGION THAT USER HAS NO INTENTION TO TOUCH WITHIN SCREEN | SHORTEN |
| SECOND CONDITION | 7 | NUMBER OF FINGERS IS LARGE | LENGTHEN |
| | 8 | NON-USE STATE OF ELECTRONIC PEN HAS BEEN DETECTED | LENGTHEN |

| CONDITION NAME | CONDITION ID | DETERMINATION CONDITION | SCAN RATE |
|---|---|---|---|
| FIRST CONDITION | 1 | NUMBER OF FINGERS IS SMALL | INCREASE |
| | 2 | PALM REGION HAS BEEN DETECTED | INCREASE |
| | 3 | MOVING SPEED OF FINGER IS LOW | INCREASE |
| | 4 | SIZE OF TOUCH SENSOR IS SMALL | INCREASE |
| | 5 | REFRESH RATE OF DISPLAY PANEL IS HIGH | INCREASE |
| | 6 | THERE IS PARTIAL REGION THAT USER HAS NO INTENTION TO TOUCH WITHIN SCREEN | INCREASE |
| SECOND CONDITION | 7 | NUMBER OF FINGERS IS LARGE | DECREASE |
| | 8 | NON-USE STATE OF ELECTRONIC PEN HAS BEEN DETECTED | DECREASE |

| CONDITION NAME | CONDITION ID | DETERMINATION CONDITION | TOUCH EXECUTION PERIOD |
|---|---|---|---|
| FIRST CONDITION | 1 | NUMBER OF FINGERS IS SMALL | SHORTEN |
| | 2 | PALM REGION HAS BEEN DETECTED | SHORTEN |
| | 3 | MOVING SPEED OF FINGER IS LOW | SHORTEN |
| | 4 | SIZE OF TOUCH SENSOR IS SMALL | SHORTEN |
| | 5 | REFRESH RATE OF DISPLAY PANEL IS HIGH | SHORTEN |
| | 6 | THERE IS PARTIAL REGION THAT USER HAS NO INTENTION TO TOUCH WITHIN SCREEN | SHORTEN |
| SECOND CONDITION | 7 | NUMBER OF FINGERS IS LARGE | LENGTHEN |
| | 8 | NON-USE STATE OF ELECTRONIC PEN HAS BEEN DETECTED | LENGTHEN |

TOUCH STATE DETECTION CIRCUIT, ELECTRONIC DEVICE INCLUDING TOUCH STATE DETECTION CIRCUIT, AND TOUCH STATE DETECTION METHOD

BACKGROUND

Technical Field

The present disclosure relates to a touch state detection circuit, an electronic device including the touch state detection circuit, and a touch state detection method.

Background Art

Conventionally, touch state detection circuits that detect a touch state in which a user's finger or the like touches a detection surface have been known. For example, a touch state detection circuit described in Japanese Patent Laid-Open No. 2020-177591 is connected to a capacitance-type touch sensor including a plurality of sensor electrodes disposed in a planar manner and detects the touch state by executing a scan process that reads out and processes detection signals sequentially output from the sensor electrodes.

Conventionally, a fixed time during which a touch state detection function can be executed even under various use cases is set as an execution period of a scan process for detecting the touch state. As a specific example, taking into account a case where user's fingers touch a detection surface at the same time, the execution period is set to be long enough that electrical noise caused by this touch has no effect. With this setting, however, even if the number of user's fingers touching the detection surface is small, it takes the fixed time to detect the touch state, generating an unnecessary waiting time.

BRIEF SUMMARY

Therefore, it is an object of the present disclosure to provide a touch state detection circuit, an electronic device including the touch state detection circuit, and a touch state detection method that can perform detection suitable for various conditions compared to the case where a scan condition of a scan process for detecting a touch state is fixed.

A touch state detection circuit according to a first aspect of the present disclosure is connected to a capacitance-type touch sensor including a plurality of sensor electrodes disposed in a planar manner and detects a touch state of a user by executing a scan process that reads out and processes detection signals sequentially output from the sensor electrodes. The touch state detection circuit includes a setting circuit which, in operation, sets a scan condition related to an execution frequency of the scan process or an execution period of the scan process, and a detection circuit which, in operation, detects the touch state by executing the scan process under the scan condition set by the setting circuit. When a determination condition indicating a situation in which the scan condition is required to be changed is satisfied, the setting circuit changes and resets the scan condition, and the detection circuit detects the touch state under the scan condition reset by the setting circuit.

In the touch state detection circuit according to a second aspect of the present disclosure, when a first condition is satisfied as the determination condition, the setting circuit changes and resets the scan condition in such a manner that the execution frequency becomes higher than a reference execution frequency or the execution period becomes shorter than a reference execution period.

In the touch state detection circuit according to a third aspect of the present disclosure, the first condition at least indicates that a number of fingers of the user is equal to or less than a threshold value when the touch state of one or more fingers of the user has been detected.

In the touch state detection circuit according to a fourth aspect of the present disclosure, the threshold value is the number of fingers of one hand of the user.

In the touch state detection circuit according to a fifth aspect of the present disclosure, the first condition at least indicates that the touch state of a palm of the user has been detected.

In the touch state detection circuit according to a sixth aspect of the present disclosure, the first condition at least indicates that a moving speed of a finger of the user is equal to or less than a threshold value when the touch state of the finger has been detected.

In the touch state detection circuit according to a seventh aspect of the present disclosure, the first condition at least indicates that a size of the touch sensor is equal to or less than a threshold value.

In the touch state detection circuit according to an eighth aspect of the present disclosure, the first condition at least indicates that a refresh rate of a display panel is higher than a threshold value when the touch sensor is superimposed on the display panel.

In the touch state detection circuit according to a ninth aspect of the present disclosure, the first condition at least indicates that there is a partial region that the user has no intention to touch within an entire region in which the touch state is detectable by the touch sensor.

In the touch state detection circuit according to a tenth aspect of the present disclosure, when a second condition is satisfied as the determination condition, the setting circuit changes and resets the scan condition in such a manner that the execution frequency becomes lower than a reference or the execution period becomes longer than a reference. In the touch state detection circuit according to an eleventh aspect of the present disclosure, the second condition at least indicates that the number of fingers of the user is equal to or greater than a threshold value when the touch state of one or more fingers of the user has been detected.

In the touch state detection circuit according to a twelfth aspect of the present disclosure, the scan process is executed to further detect a pen state of an electronic pen, and the second condition at least indicates that a non-use state of the electronic pen has been detected.

In the touch state detection circuit according to a thirteenth aspect of the present disclosure, the scan process is executed to detect a pen state of an electronic pen and the touch state in a time-division manner, the scan condition indicates a ratio of the execution frequency of the scan process for detecting the touch state to the execution frequency of the scan process for detecting the pen state, and when the determination condition is satisfied, the setting circuit changes and resets the ratio.

An electronic device according to a fourteenth aspect of the present disclosure includes a capacitance-type touch sensor including a plurality of sensor electrodes disposed in a planar manner, and the touch state detection circuit according to any one of the first to thirteenth aspects, the touch state detection circuit being connected to the touch sensor.

A touch state detection method according to a fifteenth aspect of the present disclosure is performed by a touch state detection circuit which is connected to a capacitance-type touch sensor including a plurality of sensor electrodes disposed in a planar manner and which detects a touch state of a user by executing a scan process that reads out and processes detection signals sequentially output from the sensor electrodes. The touch state detection method includes setting a scan condition related to an execution frequency of the scan process or an execution period of the scan process, and detecting the touch state by executing the scan process under the scan condition set by the setting. The setting and the detecting are sequentially and repetitively performed. When a determination condition indicating a situation in which the scan condition is required to be changed is satisfied, the setting includes changing and resetting the scan condition, and the detecting includes detecting the touch state under the scan condition reset by the setting.

According to an embodiment of the present disclosure, detection suitable for various conditions can be performed compared to the case where a scan condition of a scan process for detecting a touch state is fixed.

DETAILED DESCRIPTION OF THE PREFERRED EMBODIMENTS

A touch state detection circuit, an electronic device including the touch state detection circuit, and a touch state detection method according to various embodiments of the present disclosure will be described with reference to the accompanying drawings. To facilitate understanding of the description, the same elements or elements having the same functions will be denoted by the same reference signs as much as possible in each drawing, and redundant description will be omitted.

First Embodiment

A touch state detection circuit, an electronic device including the touch state detection circuit, and a touch state detection method according to a first embodiment of the present disclosure will be described with reference to FIGS. 1 to 9.

<Overall Configuration>

Figure 1:
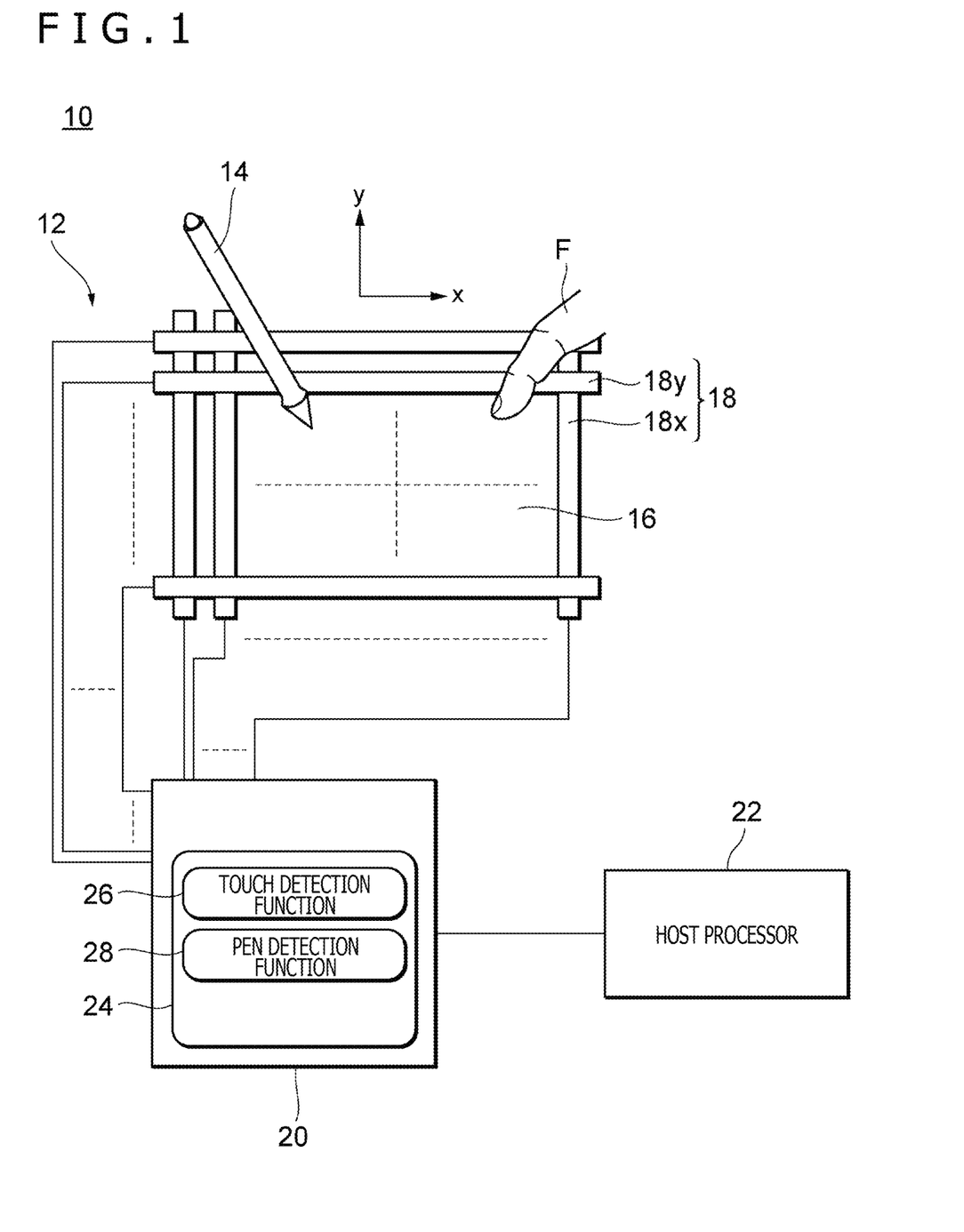
FIG. 1 is an overall configuration diagram of an input system in which a touch state detection circuit according to a first embodiment of the present disclosure is incorporated.

FIG. 1 is an overall configuration diagram of an input system 10 in which the touch state detection circuit according to the first embodiment of the present disclosure is incorporated. As illustrated in FIG. 1, the input system 10 basically includes an electronic device 12, which includes a touch panel display, and an electronic pen 14, which is a pen-type pointing device. The electronic pen 14 is also referred to as a "stylus."

The electronic device 12 includes, for example, a tablet-type terminal, a smartphone, or a personal computer. A user can draw pictures and characters on the electronic device 12 by grasping the electronic pen 14 with one hand and moving it while pressing a pen tip against a detection surface 16 of the electronic device 12. By bringing the user's finger or fingers F into contact with the detection surface 16, the user can also perform a desired operation via a user control being displayed.

The electronic device 12 includes a touch sensor 18, a touch IC 20, which is the touch state detection circuit, and a host processor 22. The touch sensor 18 includes a combination of a plurality of electrodes that are superimposed on a display panel (not illustrated) such as a liquid crystal. The touch sensor 18 is a capacitance-type touch sensor including a plurality of sensor electrodes disposed in a planar manner. The touch sensor 18 includes a plurality of sensor electrodes 18x for detecting a position on an X-axis and a plurality of sensor electrodes 18y for detecting a position on a Y-axis. An x-direction and a y-direction illustrated in FIG. 1 respectively correspond to the X-axis and the Y-axis of a Cartesian coordinate system defined on the detection surface 16 of the touch sensor 18.

The sensor electrodes 18x, which are each shaped like a belt and extend in the y-direction, are disposed at equal intervals along the x-direction. The sensor electrodes 18y, which are each shaped like a belt and extend in the x-direction, are disposed at equal intervals along the y-direction. Instead of a mutual capacitance type sensor described above, a self-capacitance type sensor in which block-shaped electrodes are disposed in a two-dimensional grid pattern may be used as the touch sensor 18.

The touch IC 20 is an integrated circuit that can execute firmware 24 and connected to each of the plurality of sensor electrodes 18x and 18y, which constitute the touch sensor 18. The firmware 24 executes a scan process that reads out and processes detection signals sequentially output from the sensor electrodes 18x and 18y. The firmware 24 is capable of implementing a touch detection function 26 and a pen detection function 28 by executing the scan process. Specifically, the touch detection function 26 executes a process of detecting a touch state of a detection target that is part of a human body such as a finger F of the user (hereinafter referred to as "touch detection") by executing the scan process. The pen detection function 28 executes a process of detecting a pen state of the electronic pen 14 (hereinafter referred to as "pen detection") by executing the scan process. The touch state includes a touch state of one or more fingers F of the user and a touch state of a palm (part of a hand having a region wider than the fingers F and including the palm, the back of the hand, and first) of the user. The touch state includes, for example, a position or positions of the finger or fingers F or the palm touching the detection surface 16. The pen state includes, for example, a position, a tilt, and a pen pressure of the electronic pen 14 contacting the detection surface 16.

Figure 2:
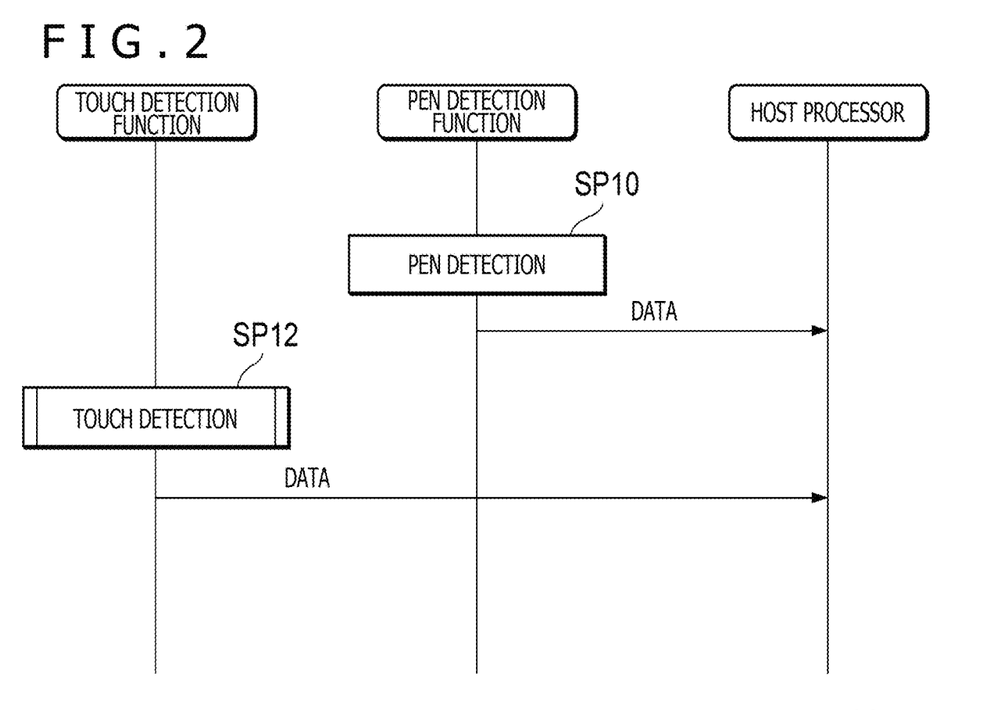
FIG. 2 is a sequence diagram illustrating a process flow of pen detection and touch detection in a touch integrated circuit (IC)

FIG. 2 is a sequence diagram illustrating a process flow of the pen detection and the touch detection in the touch IC 20. As illustrated in FIG. 2, the touch IC 20 repetitively executes the pen detection by the pen detection function 28 (SP10) and the touch detection by the touch detection function 26 (SP12) in a time-division manner. The execution frequency of the pen detection and the execution frequency of the touch detection are preset to be a predetermined ratio. In the example illustrated in FIG. 2, the ratio of the execution frequency between the pen detection and the touch detection in one repetition cycle is 1:1. However, the ratio of the execution frequency therebetween may be 1:n, n:1, or n:m (where n and m are integers).

The pen detection in SP10 includes, for example, the scan process of scanning the touch sensor 18 (global scan or sector scan), a process of receiving and analyzing a downlink signal transmitted from the electronic pen 14, a process of estimating the pen state of the electronic pen 14, and a process of generating and transmitting an uplink signal including a command to the electronic pen 14. The touch detection in SP12 includes, for example, the scan process of scanning the touch sensor 18, a process of creating a heat map (two-dimensional distribution of detection levels) on the touch sensor 18, and a process of estimating the touch state of the finger or fingers F.

Described with reference to FIG. 1 again, the host processor 22 is a processor including a central processing unit (CPU) or a graphics processing unit (GPU). The host processor 22 reads out and executes a program from a memory, not illustrated, to execute, for example, a process of generating digital ink with use of data from the touch IC 20 and a rendering process for displaying drawing contents indicated by the digital ink.

<Functional Configuration of Touch IC 20>

Figure 3:
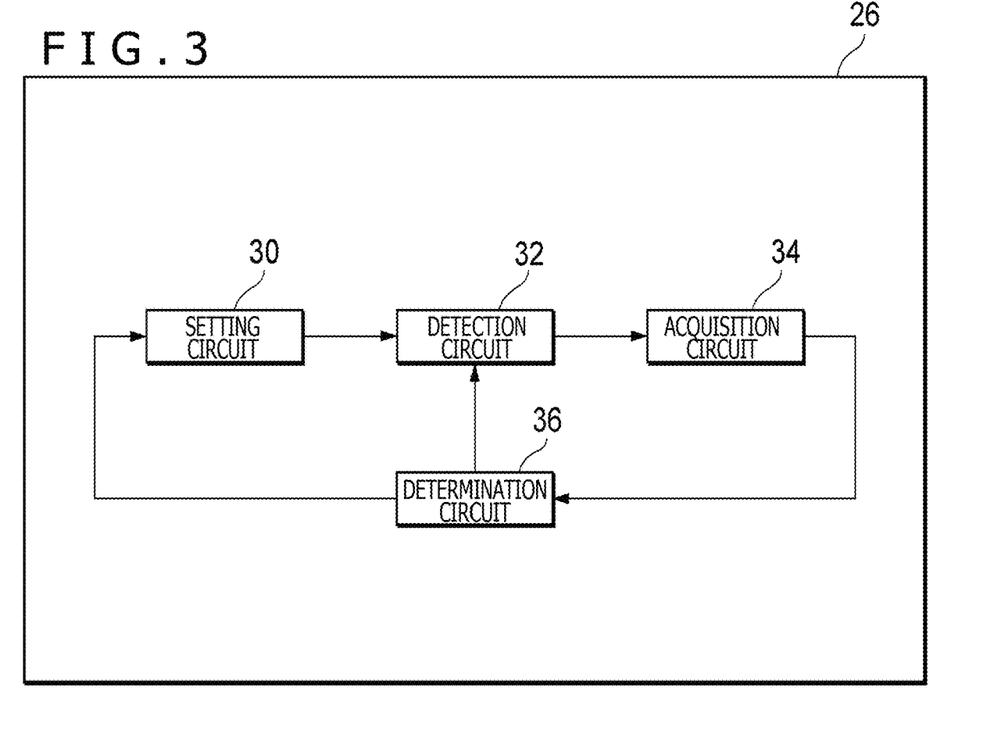
FIG. 3 is a functional block diagram illustrating a touch detection function of the touch IC illustrated in FIG. 1.

FIG. 3 is a functional block diagram illustrating the touch detection function 26 of the touch IC 20 illustrated in FIG. 1. As illustrated in FIG. 3, the touch detection function 26 includes a setting circuit 30, a detection circuit 32, an acquisition circuit 34, and a determination circuit 36.

The setting circuit 30 sets a scan condition related to the execution frequency of the scan process or the execution period of the scan process. Here, the execution frequency of the scan process indicates at what time intervals the scan process for detecting the touch state is repeated. The execution period of the scan process indicates the execution period (hereinafter referred to as a "touch execution period") of the scan process for detecting the touch state.

Figure 4:
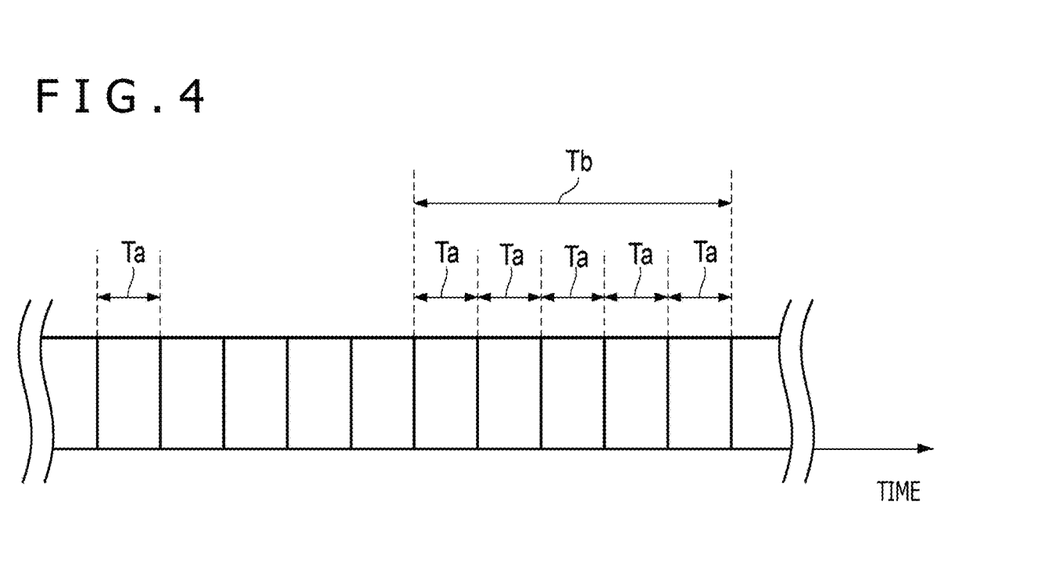
FIG. 4 is a graph for conceptually describing a touch execution period.

FIG. 4 is a graph for conceptually describing the touch execution period. The graph illustrated in FIG. 4 is a time uniaxial graph with each scan process indicated by a square. As illustrated in FIG. 4, when the touch detection is ON, the scan process for detecting the touch state is executed multiple times consecutively and repetitively. Note that the scan process does not have to be executed multiple times consecutively and repetitively and may be executed intermittently by, for example, alternating with the scan process for detecting the pen state. Specifically, the touch execution period indicates a scan time Ta taken for one scan process. Since one scan time Ta is a short time, the touch execution period may be an integrated scan time Tb, which is the sum of scan times Ta for a predetermined number of scan processes.

The scan time Ta (scan time taken for one scan process) is a duration of time from a timing at which the scan condition is set until frame data, which is detection data for one scan process, is acquired and then the scan condition starts to be set again. A specified time is set as the scan time Ta.

Figure 5:
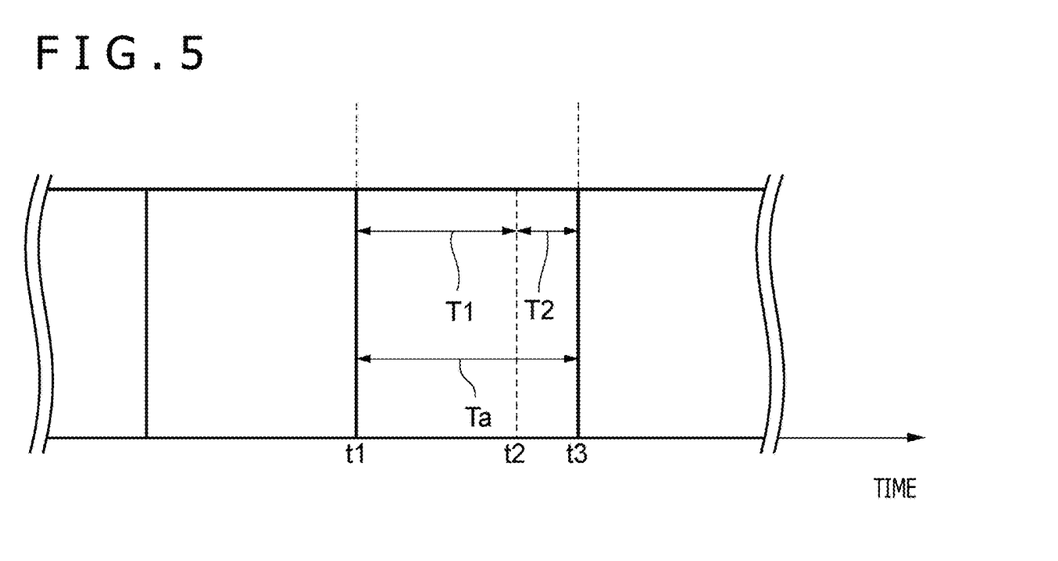
FIG. 5 is a graph for conceptually describing a scan time.

FIG. 5 is a graph for conceptually describing the scan time Ta. The graph of FIG. corresponds to an enlarged view of one scan time Ta illustrated in the graph of FIG. 4. As illustrated in FIG. 5, the scan time Ta includes an actual scan time T1 and a non-scan time T2. The actual scan time T1 (t1 to t2) indicates a time required for an actual scan process such as readout of a detection signal, calculation, and output of detection data. The non-scan time T2 (t2 to t3) indicates a waiting time until the scan condition is set again after the detection data is output.

Figure 6:
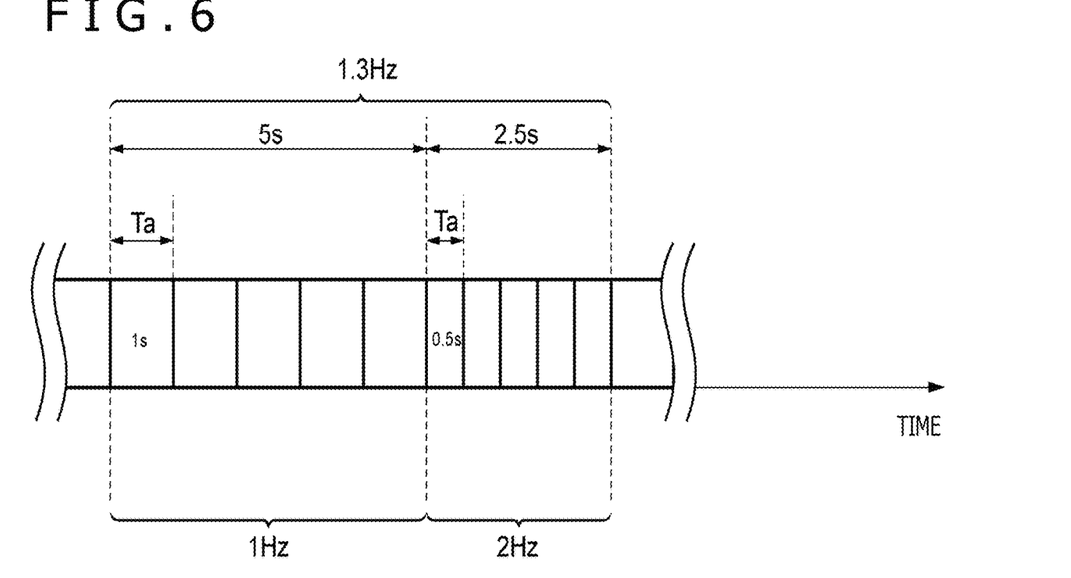
FIG. 6 is a diagram for describing a definition of a scan rate as a scan condition.

In the first embodiment, the scan condition is described as a scan rate related to the frequency of the scan process for detecting the touch state. The scan rate is also referred to as a scan frequency. FIG. 6 is a diagram for describing a definition of the scan rate as the scan condition. As in FIG. 4, each scan process is indicated by a square. As illustrated in FIG. 6, the scan rate indicates, for example, the number of scan processes to be executed per certain period of time. For example, if the scan process is repeated five times with a scan time Ta of 1 sec, the scan rate for executing the five scan processes is 1 Hz. By contrast, if the scan process is, for example, repeated five times with a scan time Ta of 0.5 sec, the scan rate for executing the five scan processes is 2 Hz. In other words, the scan rate changes as the scan time Ta changes. In a time period where multiple scan rates exist, an average of scan rates during this time period may be calculated as the scan rate. For example, assume that the scan process is repeated five times with a scan time Ta of 1 sec, after which the scan process is repeated five times with a scan time Ta of 0.5 sec. In this case, the average scan rate for the entire process of executing the 10 scan processes is 1.3 Hz.

The setting circuit 30 sets an initial value of the scan rate to 100 Hz, for example. In addition, when a determination condition indicating a situation in which the scan rate, which is the scan condition, is required to be changed is satisfied, the setting circuit 30 changes and resets the scan rate. This determination condition includes a first condition and a second condition. The first condition indicates a situation in which the scan rate is required to be higher than a reference. The second condition indicates a situation in which the scan rate is required to be lower than the reference. The reference here refers to a reference value for the scan rate, which may be, for example, a predetermined value set as an initial value or a previous setting value immediately before the determination of the determination condition.

When the first condition is determined to be satisfied, the setting circuit 30 makes the scan rate higher than the reference. For example, if the reference is a previous setting value and the previous setting value is 100 Hz, the setting circuit 30 resets the scan rate to 150 Hz. By contrast, when the second condition is determined to be satisfied, the setting circuit 30 makes the scan rate lower than the reference. For example, if the reference is a previous setting value and the previous setting value is 150 Hz, the setting circuit 30 resets the scan rate to 100 Hz.

The setting circuit 30 resets elements correlated with the scan time Ta that defines the scan rate, in such a manner as to achieve the reset scan rate, and also resets the scan time Ta itself to make the period correspond to the elements. Examples of the elements correlated with the scan time Ta are, for example, a length of a code multiplexed signal for the touch detection and the time taken to calculate the coordinates of the detected finger or fingers F.

The length of the code multiplexed signal refers to a length of a signal of a code multiplexing system that supplies a signal having a different code pattern for each transmission conductor. When a detection range or the number of detection targets is large, it is necessary to increase the number of combinations of signals having different code patterns for respective transmission conductors and, accordingly, the length of the code multiplexed signal is required to be increased. Hence, in this case, the setting circuit increases the length of the code multiplexed signal, thereby lengthening the actual scan time T1 in the scan time Ta accordingly. When a detection range or the number of detection targets is small, on the other hand, the length of the code multiplexed signal may be decreased. Therefore, in this case, the setting circuit 30 decreases the length of the code multiplexed signal, thereby shortening the actual scan time T1 in the scan time Ta accordingly.

The time taken to calculate the coordinates of the detected finger or fingers F depends on the number of fingers F. When the number of fingers F is large, the time taken to calculate the coordinates of the fingers F is lengthened, and the actual scan time T1 in the scan time Ta is lengthened accordingly. By contrast, when the number of fingers F is small, the time taken to calculate the coordinates of the fingers F is shortened, and the actual scan time T1 in the scan time Ta is shortened accordingly.

The scan time Ta can be changed by changing the specified time set as the scan time Ta. When the detection range or the number of detection targets is large, the length of the code multiplexed signal is increased and the time taken to calculate the coordinates of the fingers F is lengthened as described above, and thus, the actual scan time T1 in the scan time Ta is lengthened accordingly. Hence, the setting circuit 30 correspondingly sets the specified time, i.e., the scan time Ta, to a longer time, thereby decreasing the scan rate. By contrast, when the detection range or the number of detection targets is small, the length of the code multiplexed signal is decreased and the time taken to calculate the coordinates of the fingers F is shortened as described above, and thus, the actual scan time T1 in the scan time Ta is shortened accordingly. Therefore, the setting circuit 30 correspondingly sets the specified time, i.e., the scan time Ta, to a shorter time, thereby increasing the scan rate.

In this way, the setting circuit 30 optimizes the scan time Ta and the scan rate defined by the scan time Ta. This secures the actual scan time T1 in the scan time Ta enough to execute the touch state detection function, and also shortens or eliminates the non-scan time T2 in the scan time Ta so as not to create an unnecessary waiting time.

The detection circuit 32 executes the scan process for detecting the touch state at the scan rate set or reset by the setting circuit 30. Specifically, the detection circuit 32 executes the scan process by using the length of the code multiplexed signal set or reset by the setting circuit 30 as the length of the code multiplexed signal for touch detection. Further, the detection circuit 32 executes the scan process by using the specified time set or reset by the setting circuit 30 as the specified time.

As the scan process for detecting the touch state, the detection circuit 32 first transmits a touch detection signal to each sensor electrode 18y and then receives a touch detection signal output from each sensor electrode 18x. In the second and subsequent scan processes, the detection circuit 32 may execute the scan process only for a region in the vicinity of the previously detected finger F's position. The detection circuit 32 then creates a heat map depicting the detection level of each two-dimensional position on the touch sensor 18, based on the result of the reception of each touch detection signal.

Based on the created heat map, the detection circuit 32 determines any region where changes in capacitance formed between the sensor electrodes 18x and the sensor electrodes 18y are equal to or greater than a threshold value. The detection circuit 32 detects, for example, a center position of this region as the position of a finger F and calculates the coordinates thereof. The detection circuit 32 then outputs the calculated coordinates to the host processor 22 and the acquisition circuit 34. The detection circuit 32 may also create frame data including the created heat map and output the frame data to the host processor 22 and the acquisition circuit 34.

Based on the created heat map, the detection circuit 32 executes a process of deriving a touch region, which is a region touched by any of the fingers F, and a region touched not by the finger F but by the palm of the user. Specifically, the detection circuit 32 determines any region where the changes in capacitance formed between the sensor electrodes 18x and the sensor electrodes 18y are equal to or greater than the threshold value. When the area of the region is equal to or less than a threshold value, the detection circuit 32 determines the region as the touch region. When not, the detection circuit 32 determines the region as a palm region. The detection circuit 32 also outputs information indicating the determined touch region and palm region to the host processor 22 and the acquisition circuit 34.

The detection circuit 32 does not start the next scan process and waits until the elapse of the specified time set as the scan time Ta, and repeats the next scan process after the elapse of the specified time.

The acquisition circuit 34 acquires various pieces of information for use in the determination by the determination circuit 36. For example, based on the coordinates of the finger or fingers F and the frame data including the heat map output from the detection circuit 32, the acquisition circuit 34 calculates and acquires the number of fingers F touching the detection surface 16 and information indicating a moving speed or speeds of the finger or fingers F. The moving speed of a finger F indicates a speed of the finger F moving along the detection surface 16. The acquisition circuit 34 also acquires information indicating the touch region and the palm region from the output of the detection circuit 32.

The acquisition circuit 34 acquires information indicating a state in which the electronic pen 14 is stored or information indicating the tilt and moving speed of the electronic pen 14 as information for determining whether or not a non-use state of the electronic pen 14 has been detected.

For example, the information indicating the state in which the electronic pen 14 is stored can be acquired by detecting, by a sensor or the like, that the electronic pen 14 is stored in the electronic device 12, and then receiving the detected information from the host processor 22. The tilt of the electronic pen 14 indicates an angle between a normal of the detection surface 16 and an axis of the electronic pen 14. The information indicating the tilt of the electronic pen 14 is acquired by obtaining two pen coordinates based on pen signals transmitted from two respective transmission electrodes of the electronic pen 14 supporting the tilt detection and then calculating the tilt of the electronic pen 14 based on a distance between the two pen coordinates. Further, the information indicating the moving speed of the electronic pen 14 is calculated based on the position coordinates of the electronic pen 14 whose pen state is detected by the pen detection function 28.

The acquisition circuit 34 acquires information indicating a size of the touch sensor 18 or the number of sensor electrodes 18x and 18y from, for example, the host processor 22. The acquisition circuit 34 also acquires information indicating a refresh rate of the display panel when the touch sensor 18 is superimposed on the display panel. The refresh rate is the number of times the display panel is rewritten during a certain period of time and indicated as 70 Hz, for example. The acquisition circuit 34 acquires information indicating the refresh rate by receiving the information from, for example, the host processor 22.

In addition, when there is a partial region that the user has no intention to touch within the entire region in which the touch state can be detected by the touch sensor 18, the acquisition circuit 34 acquires information indicating that there is such a partial region (hereinafter referred to as "non-touch region information"). For example, in the case of a dual screen model with two screens, the touch detection and the pen detection are performed on each of the two screens. When the acquisition circuit 34 receives from, for example, the host processor 22 information indicating that one of the two screens is in a non-use mode, the acquisition circuit 34 acquires this information as the non-touch region information. For example, in the case of a foldable screen configured to be foldable, when the touch sensor 18 detects a state in which an object such as a keyboard is placed on a partial region of the screen, the acquisition circuit 34 acquires information indicating this state from the touch sensor 18 and acquires the information as the non-touch region information. Further, in some cases, the electronic pen 14 is detected in multiple regions at the same time in the vicinity of one of screens in a dual screen model or in the vicinity of the position where a partial region of a foldable screen is bent. Therefore, when the acquisition circuit 34 determines that there is a region closer to a horizontal state, based on the tilt of the electronic pen 14 detected by the pen detection function 28, the acquisition circuit 34 acquires the result of the determination as the non-touch region information.

Figure 7:
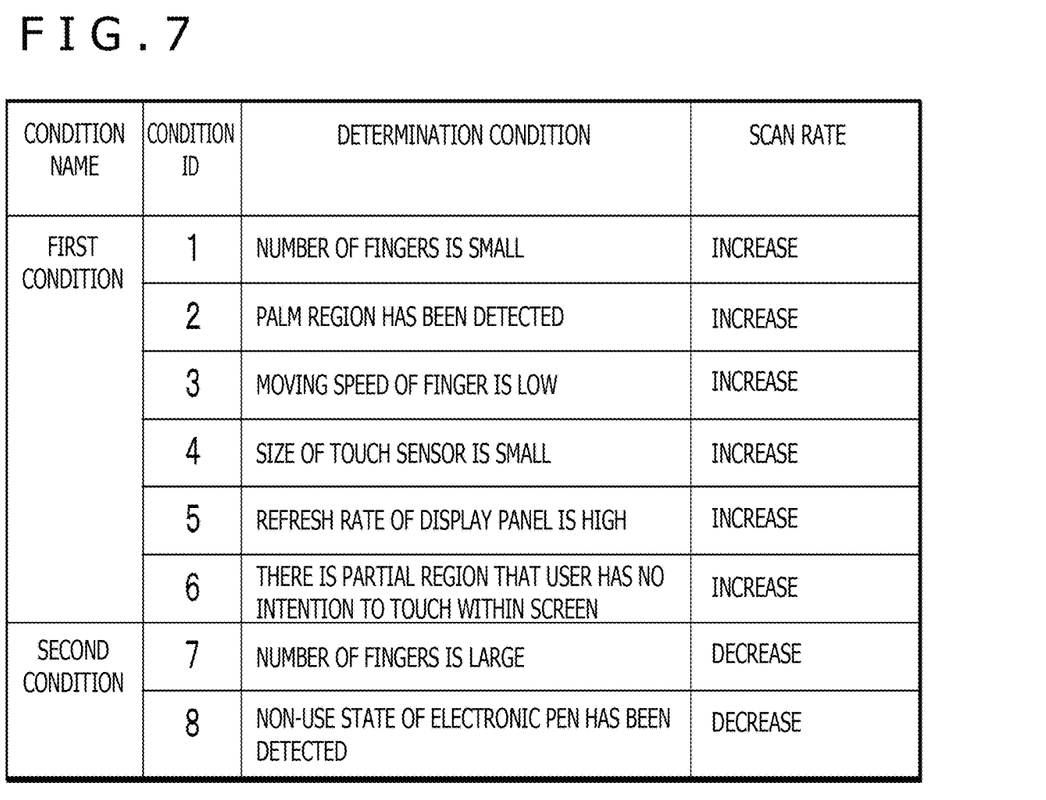
FIG. 7 is a diagram illustrating an example of combinations of first and second conditions as a determination condition and scan rates when the respective conditions are satisfied.

The determination circuit 36 determines whether or not the determination condition is satisfied based on, for example, information acquired by the acquisition circuit 34. FIG. 7 is a diagram illustrating an example of combinations of the first and second conditions as the determination condition and scan rates when the respective conditions are satisfied. As illustrated in FIG. 7, the first condition indicates, for example, conditions with condition identifiers (IDs) "1" to "6," and the second condition indicates, for example, conditions with condition IDs "7" and "8." In the present embodiment, when at least any of the conditions with the condition IDs "1" to "6" is satisfied, the determination circuit 36 determines that the first condition is satisfied. When at least any of the conditions with the condition IDs "7" and "8" is satisfied, the determination circuit 36 determines that the second condition is satisfied.

Here, the case where at least any of the plurality of conditions is satisfied is not limited to the case where any one of the conditions is satisfied, and includes the case where any combination of the plurality of conditions is satisfied. Therefore, the determination circuit 36 may determine that the first condition is satisfied not only when any one of the conditions with the condition IDs "1" to "6" is satisfied, but also when any combination of these conditions is satisfied. Further, the determination circuit 36 may determine that the second condition is satisfied not only when any one of the conditions with the condition IDs "7" and "8" is satisfied, but also when any combination of these conditions is satisfied.

The condition with the condition ID "1" is a condition for increasing the scan rate as the number of fingers F touching the detection surface 16 becomes smaller. Specifically, the condition with the condition ID "1" indicates that the number of fingers F of the user is equal to or less than a threshold value when the touch state of one or more fingers F of the user has been detected. The threshold value here is at least preset to a number less than the number of fingers F of both hands of the user (10 fingers) by, for example, a designer or an operator. For example, the threshold value is the number of fingers F of one hand of the user (5 fingers).

The determination circuit 36 determines the condition with the condition ID "1," based on the information indicating the number of fingers F acquired by the acquisition circuit 34 as the result of the scan process executed immediately before the determination. The time taken to calculate the coordinates of the fingers F when the number of fingers F is equal to or less than the threshold value is shorter than the time taken to calculate the coordinates of the fingers F when the number of fingers F is greater than the threshold value. In addition, the probability of the plurality of fingers F overlapping on the same electrode is low, and there is a high possibility that electrical noise caused by the touch by the fingers F is small. Therefore, in this case, the length of the code multiplexed signal can be decreased, and the specified time set as the scan time Ta can be shortened. This, as a result, makes the scan rate higher than the reference.

The condition with the condition ID "2" is a condition for increasing the scan rate when the detection surface 16 is touched by the palm instead of the finger or fingers F. Specifically, the condition with the condition ID "2" indicates that the touch state of the palm of the user has been detected. When the information indicating the palm region has been acquired by the acquisition circuit 34 as the result of the scan process executed immediately before the determination, the determination circuit 36 determines that the condition with the condition ID "2" is satisfied. When the palm region has been detected, the number of fingers F touching the detection surface 16 is highly likely to be small because one hand is placed on the detection surface 16. Therefore, in this case, the scan rate can be made higher than the reference for the same reason as in the case of the condition with the condition ID "1."

The condition with the condition ID "3" is a condition for increasing the scan rate as the moving speed of a finger F becomes lower. Specifically, the condition with the condition ID "3" indicates that the moving speed of a finger F of the user is equal to or less than a threshold value when the touch state of the finger F of the user has been detected. The threshold value here is preset to, for example, 5 mm/sec by, for example, a designer or an operator. The determination circuit 36 determines the condition with the condition ID "3," based on the information indicating the moving speed of the finger F acquired by the acquisition circuit 34 as the result of the scan process executed immediately before the determination. When the moving speed of the finger F is equal to or less than the threshold value, the region actually being used by the user is small, and therefore, the detection range can be regarded as small. Hence, in this case, the length of the code multiplexed signal can be decreased, and the specified time set as the scan time Ta can be shortened. This, as a result, makes the scan rate higher than the reference.

The condition with the condition ID "4" is a condition for increasing the scan rate as the detection range of the touch sensor 18 becomes smaller. Specifically, the condition with the condition ID "4" indicates that the size of the touch sensor 18 is equal to or less than a threshold value. The threshold value here is preset to a size corresponding to a small electronic device such as a smartphone or a tablet by, for example, a designer or an operator. For example, the threshold value is 11 inches. The determination circuit 36 determines the condition with the condition ID "4," based on the information indicating the size of the touch sensor 18 acquired by the acquisition circuit 34. When the size of the touch sensor 18 is equal to or less than the threshold value, the detection range of the touch state is small. Therefore, in this case, the length of the code multiplexed signal can be decreased, and the specified time set as the scan time Ta can be shortened. This, as a result, makes the scan rate higher than the reference. Instead of or in addition to the size of the touch sensor 18, the condition with the condition ID "4" may indicate that the number of sensor electrodes 18x and 18y is equal to or less than a threshold value.

The condition with the condition ID "5" is a condition for increasing the scan rate as the refresh rate of the display panel on which the touch sensor 18 is superimposed becomes higher. Specifically, the condition with the condition ID "5" indicates that the refresh rate of the display panel is higher than a threshold value when the touch sensor 18 is superimposed on the display panel. The threshold value here is preset to a refresh rate corresponding to a screen display of a game or the like by, for example, a designer or an operator. For example, the threshold value is 120 to 160 Hz. The determination circuit 36 determines the condition with the condition ID "5," based on the information indicating the refresh rate of the display panel acquired by the acquisition circuit 34. When the refresh rate of the screen on which the touch sensor 18 is disposed is higher than the threshold value, the determination circuit 36 makes the scan rate higher than the reference in such a manner that the scan rate corresponds to the refresh rate.

The condition with the condition ID "6" is a condition for increasing the scan rate when there is a region that the user has no intention to touch within the detection range. Specifically, the condition with the condition ID "6" indicates that there is a partial region that the user has no intention to touch within the entire region in which the touch state can be detected by the touch sensor 18. When the non-touch region information has been acquired by the acquisition circuit 34, the determination circuit 36 determines that there is a partial region that the user has no intention to touch. When there is such a partial region that the user has no intention to touch, the detection range of the touch state is smaller than that in the case where there is no such a partial region. Therefore, in this case, the length of the code multiplexed signal can be decreased, and the specified time specified as the scan time Ta can be shortened. This, as a result, makes the scan rate higher than the reference.

The condition with the condition ID "7" is a condition for decreasing the scan rate as the number of fingers F touching the detection surface 16 becomes larger. Specifically, the condition with the condition ID "7" indicates that the number of fingers F is equal to or greater than a threshold value when the touch state of one or more fingers F of the user has been detected. The threshold value here is, for example, preset to the number of fingers F (6 to 10 fingers) greater than the number of fingers F of one hand of the user by, for example, a designer or an operator. The determination circuit 36 determines the condition with the condition ID "7," based on the information indicating the number of fingers F acquired by the acquisition circuit 34 as the result of the scan process executed immediately before the determination. The time taken to calculate the coordinates of the fingers F when the number of fingers F is equal to or greater than the threshold value is longer than the time taken to calculate the coordinates of the fingers F when the number of fingers F is smaller than the threshold value. In addition, the probability of the plurality of fingers F overlapping on the same electrode is high, and there is a high possibility that electrical noise caused by the touch by the fingers F is large. Therefore, in this case, it is necessary to increase the length of the code multiplexed signal and lengthen the specified time set as the scan time Ta. As a result, the scan rate is required to be lower than the reference.

The condition with the condition ID "8" is a condition for decreasing the scan rate when the pen state is not detectable. Specifically, the condition with the condition ID "8" indicates that the non-use state of the electronic pen 14 has been detected. When the information indicating the state in which the electronic pen 14 is stored has been acquired by the acquisition circuit 34, the determination circuit 36 determines that the non-use state of the electronic pen 14 has been detected. Further, when the electronic pen 14 tilts excessively horizontally based on the information indicating the tilt of the electronic pen 14 acquired by the acquisition circuit 34 as the result of the scan process executed immediately before the determination, the determination circuit 36 determines that the non-use state of the electronic pen 14 has been detected. In addition, when the moving speed of the electronic pen 14 is equal to or less than a threshold value based on the information indicating the moving speed acquired by the acquisition circuit 34 as the result of the scan process executed immediately before the determination, the determination circuit 36 determines that the non-use state of the electronic pen 14 has been detected. When the electronic pen 14 is in the non-use state, there is a high possibility that the detection surface 16 is touched by more fingers F than in the case where the electronic pen 14 is in use. Therefore, in this case, the scan rate is required to be lower than the reference for the same reason as in the case of the condition with the condition ID "7."

Further, the determination circuit 36 also makes a determination about a processing time in the touch detection. For example, the determination circuit 36 determines whether or not the specified time set or reset as the scan time Ta has elapsed, and outputs the determination result to the detection circuit 32.

<Process Flow of Touch IC 20>

Figure 8:
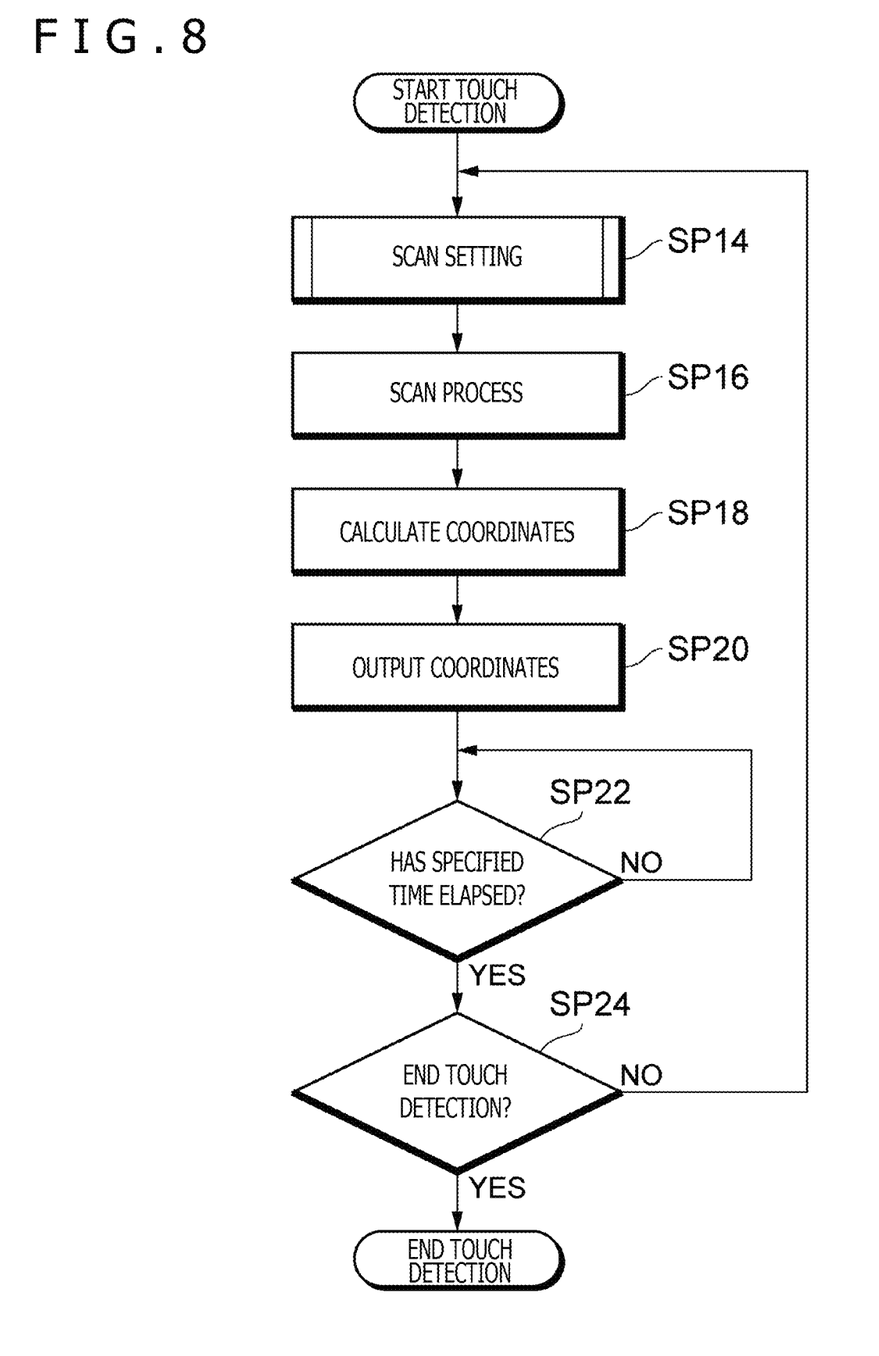
FIG. 8 is a flowchart illustrating an example of a process flow of the touch IC when the touch detection is executed by the touch detection function.

Next, a process flow of the touch IC 20 when the touch detection is executed by the touch detection function 26 will be described with reference to a flowchart illustrated in FIG. 8. FIG. 8 is a flowchart illustrating an example of the process flow of the touch IC 20 when the touch detection is executed by the touch detection function 26. The order of the following acts can be changed as appropriate.

(SP14)

When the touch detection starts, the setting circuit 30 performs initial setting of the scan rate as scan setting including setting of the scan condition. Further, after proceeding from SP24, the setting circuit 30 changes and resets the scan rate. The process then proceeds to SP16.

The detection circuit 32 executes the scan process at the scan rate set or reset by the process at SP14. Specifically, the detection circuit 32 transmits a touch detection signal to each sensor electrode 18y and receives a touch detection signal output from each sensor electrode 18x. Based on the result of the reception, the detection circuit 32 creates a heat map. The process then proceeds to SP18.

(SP18)

The detection circuit 32 calculates the coordinates of the detected finger or fingers F, based on the heat map created by the process at SP16. The process then proceeds to SP20.

(SP20)

The detection circuit 32 outputs the coordinates calculated by the process at SP18 to the host processor 22. The process then proceeds to SP22.

(SP22)

The determination circuit 36 determines whether or not the specified time set or reset as the scan time Ta has elapsed. When the determination result is negative, the determination circuit 36 repeats the determination. When the determination result is positive, the process then proceeds to SP24.

(SP24)

The determination circuit 36 determines whether or not to end the touch detection. When the determination result is negative, the process proceeds to SP14. When the determination result is positive, the series of processes illustrated in FIG. 8 ends.

Figure 9:
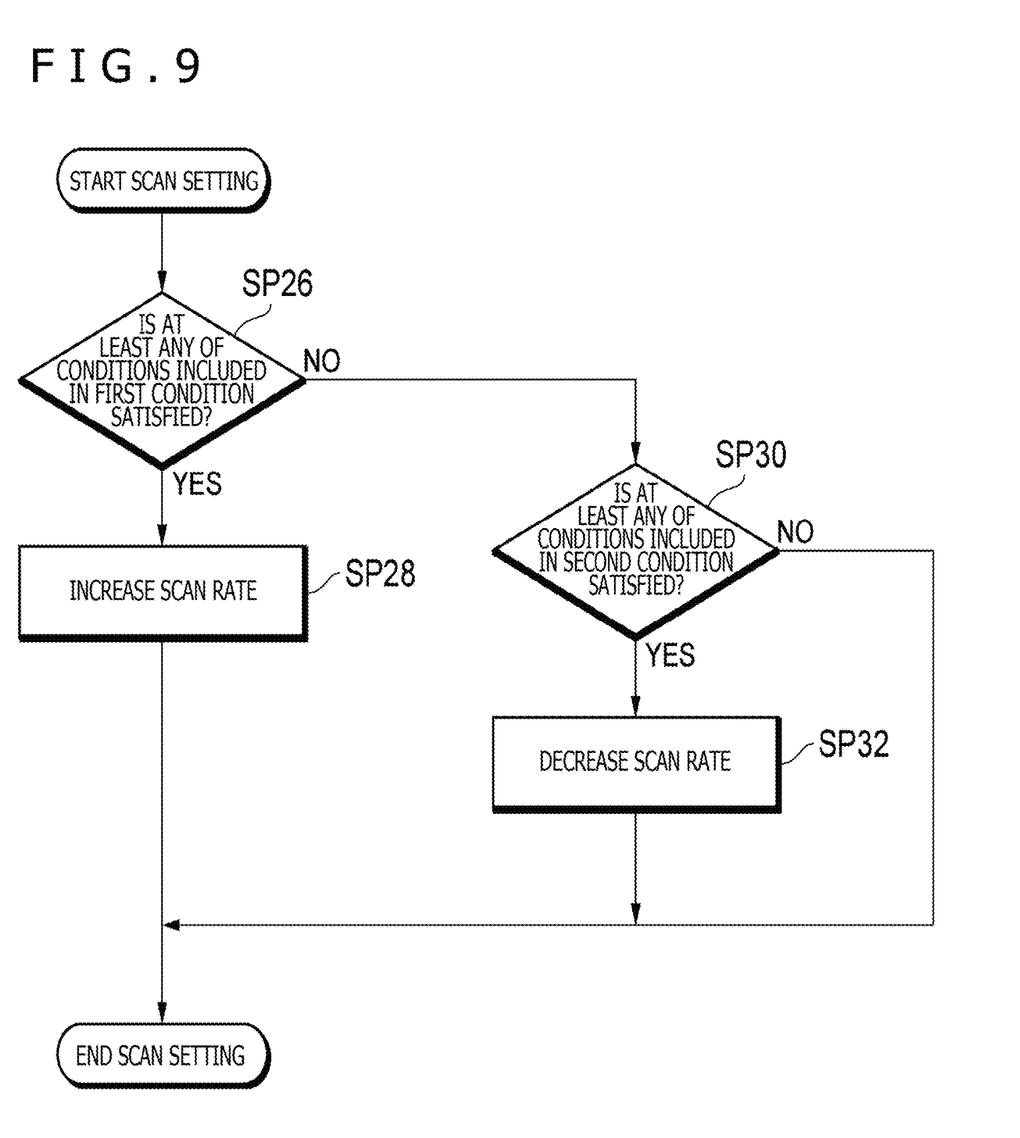
FIG. 9 is a flowchart illustrating an example of a process flow of a scan setting at SP14 of FIG. 8.

FIG. 9 is a flowchart illustrating an example of a process flow of the scan setting at SP14 of FIG. 8.

(SP26)

The determination circuit 36 determines whether or not at least any of the conditions with the condition IDs "1" to "6" of the first condition is satisfied. When the determination result is positive, the process proceeds to SP28. When the determination result is negative, the process proceeds to SP30.

(SP28)

The setting circuit 30 resets the scan rate to make it higher than the reference. Specifically, the setting circuit 30 decreases the length of the code multiplexed signal and shortens the specified time to be determined by the process at SP22, in order to achieve the reset scan rate. After that, the setting circuit 30 ends the scan setting.

(SP30)

The determination circuit 36 determines whether or not at least any of the conditions with the condition IDs "7" and "8" of the second condition is satisfied. When the determination result is positive, the process proceeds to SP32. When the determination result is negative, the determination circuit 36 ends the scan setting without resetting it.

(SP32)

The setting circuit 30 resets the scan rate to make it lower than the reference and ends the scan setting. Specifically, the setting circuit 30 increases the length of the code multiplexed signal and lengthens the specified time to be determined by the process at SP22, in order to achieve the reset scan rate. After that, the setting circuit 30 ends the scan setting.

Advantageous Effects

In the first embodiment described above, the electronic device 12 includes the capacitance-type touch sensor 18, which includes the plurality of sensor electrodes 18x and 18y disposed in a planar manner, and the touch IC 20, which is connected to the touch sensor 18. The touch IC 20 is a touch state detection circuit which is connected to the touch sensor 18 and which detects the touch state of the user by executing the scan process that reads out and processes detection signals sequentially output from the sensor electrodes 18x and 18y. The touch IC 20 includes the setting circuit 30, which sets the scan rate as the scan condition related to the execution frequency of the scan process, and the detection circuit 32, which detects the touch state by executing the scan process at the set scan rate. When the determination condition indicating the situation in which the scan rate is required to be changed is satisfied, the setting circuit 30 changes and resets the scan rate. The detection circuit 32 detects the touch state at the reset scan rate.

A touch state detection method for detecting the touch state of the user in the touch IC 20 includes a setting of setting the scan rate (SP14) and a detection of detecting the touch state by executing the scan process at the set scan rate (SP16 to SP24). The setting and the detection are sequentially and repetitively performed. When the determination condition is satisfied, the setting includes changing and resetting the scan rate, and the detection includes detecting the touch state at the reset scan rate.

With the touch IC 20, the electronic device 12, and the touch state detection method according to the first embodiment, the scan rate is changed and reset when the determination condition is satisfied. Therefore, the scan time Ta can be changed and optimized according to, for example, the detection target or the detection range. This secures the actual scan time T1 enough to execute the touch state detection function, and also shortens or eliminates the non-scan time T2 so as not to create an unnecessary waiting time. As a result, compared to the case where the scan rate is fixed, detection suitable for various conditions can be performed.

When the first condition is satisfied as the determination condition, the setting circuit 30 changes and resets the scan rate to make it higher than the reference. The first condition indicates at least any of the conditions with the condition IDs "1" to "6" illustrated in FIG. 7.

With this configuration, the scan rate can be increased and the scan time Ta can be shortened according to the situation in which at least any of the conditions with the condition IDs "1" to "6" is satisfied. In particular, in the condition with the condition ID "1," the threshold value is set to 5 fingers, which is the number of fingers F of one hand of the user. Accordingly, the scan time Ta can be optimized distinctively from a touch by both hands.

When the second condition is satisfied as the determination condition, the setting circuit 30 changes and resets the scan rate to make it lower than the reference. The second condition indicates at least any of the conditions with the condition IDs "7" and "8" illustrated in FIG. 7.

With this configuration, the scan rate can be decreased and the scan time Ta can be lengthened according to the situation in which at least any of the conditions with the condition IDs "7" and "8" is satisfied.

Second Embodiment

Next, a touch state detection circuit, an electronic device including the touch state detection circuit, and a touch state detection method according to a second embodiment of the present disclosure will be described with reference to FIGS. 10 and 11. As in the first embodiment, the electronic device 12 includes the touch IC 20, which is the touch state detection circuit according to the second embodiment. Hereinafter, configurations and functions similar or identical to those in the first embodiment are denoted by the same reference signs, and detailed description thereof is omitted as appropriate. The following description focuses on differences from the first embodiment.

<Functional Configuration of Touch IC 20>

The second embodiment is different from the first embodiment in that the scan condition is not the scan rate but the scan condition related to the touch execution period, specifically, the scan time Ta, which is the touch execution period.

The setting circuit 30 sets an initial value of the scan time Ta to, for example, 10 msec. When a determination condition indicating a situation in which the scan time Ta, which is the scan condition, is required to be changed is satisfied, the setting circuit 30 changes and resets the scan time Ta. The determination condition includes a first condition and a second condition. The first condition indicates a situation in which the scan time Ta is required to be shorter than a reference. The second condition indicates a situation in which the scan time Ta is required to be longer than the reference. The reference here is a reference value for the scan time Ta, which may be, for example, a value preset as an initial value, a previous setting value immediately before the determination of the determination condition, or a pen scan time. The pen scan time is a scan time taken for one scan process to detect the pen state and corresponds to the scan time Ta.

When the first condition is satisfied, the setting circuit 30 makes the scan time Ta shorter than the reference. On the other hand, when the second condition is satisfied, the setting circuit 30 makes the scan time Ta longer than the reference. When the reference is the pen scan time, the scan time Ta may be changed relative to the pen scan time by changing the pen scan time. For example, the scan time Ta may be lengthened relative to the pen scan time by stopping the scan process for detecting the pen state and setting the pen scan time to 0.

The detection circuit 32 executes the scan process for detecting the touch state in the scan time Ta set or reset by the setting circuit 30.

Figure 10:
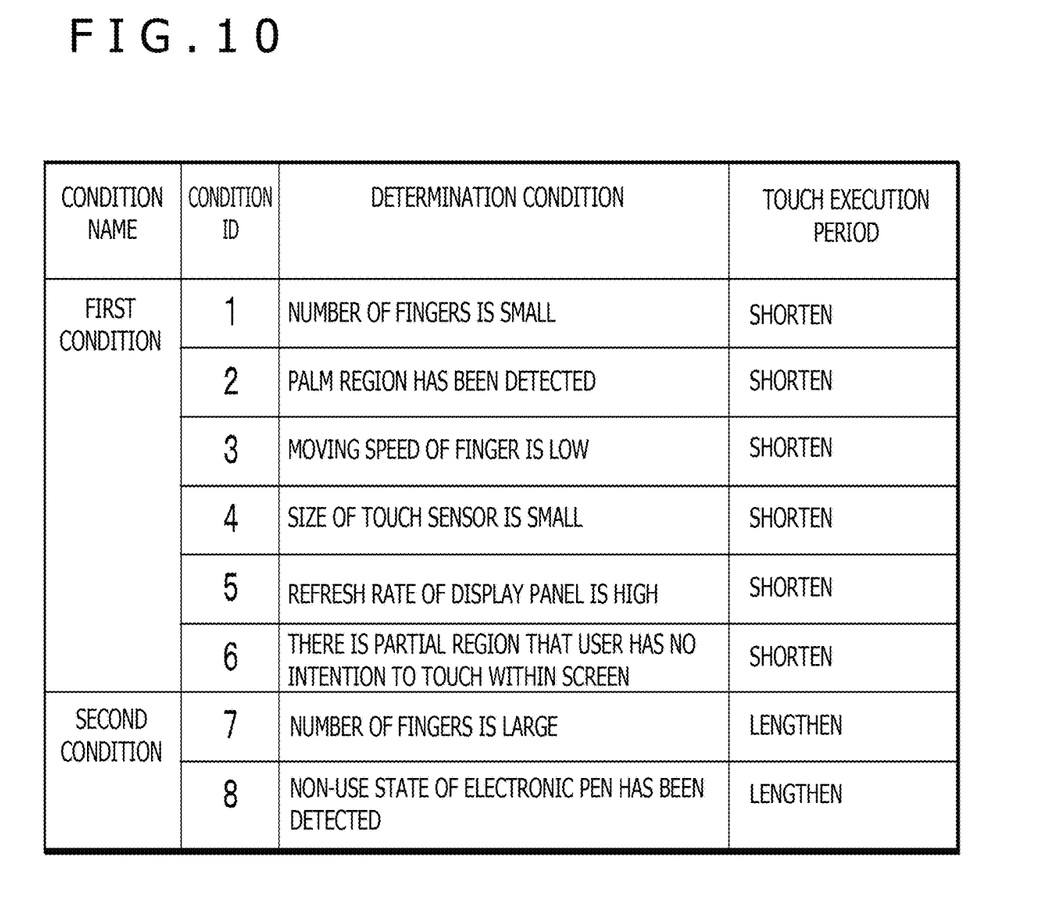
FIG. 10 is a diagram illustrating an example of combinations of the first and second conditions as the determination condition and touch execution periods (scan times) when the respective conditions are satisfied, according to a second embodiment.
Figure 11:
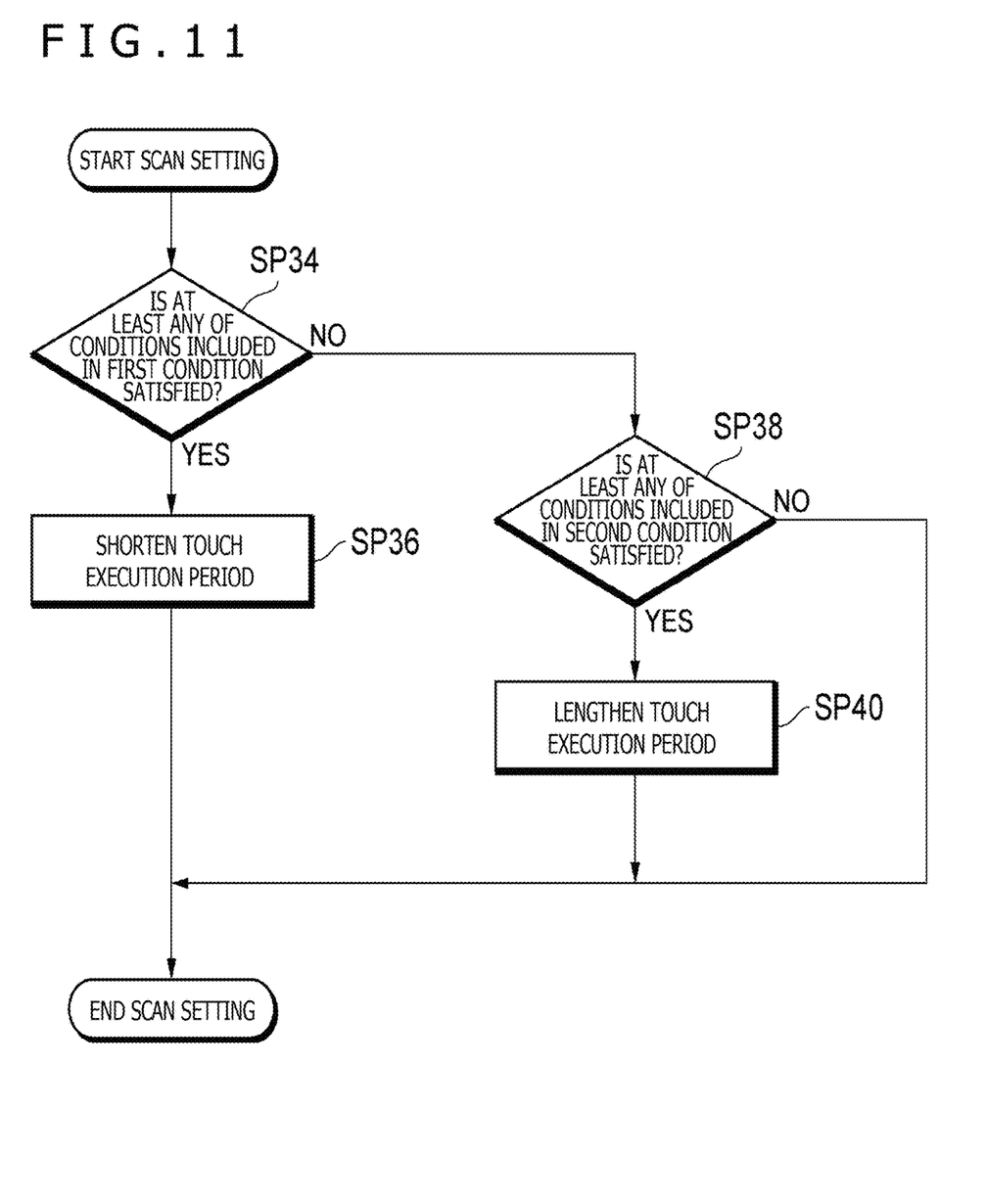
FIG. 11 is a flowchart according to the second embodiment, illustrating an example of a process flow of the scan setting at SP14 of FIG. 8.

FIG. 10 is a diagram illustrating an example of combinations of the first and second conditions as the determination condition and touch execution periods (scan times Ta) when the respective conditions are satisfied, according to the second embodiment. FIG. 10 corresponds to FIG. 7. As illustrated in FIG. 10, the first and second conditions as the determination condition according to the second embodiment are the same as those in the first embodiment.

<Process Flow of Touch IC 20>

In the second embodiment, a process flow of the touch IC 20 when the touch detection is executed by the touch detection function 26 is similar to the flowchart of FIG. 8. In the second embodiment, the process flow of the scan setting at SP14 of FIG. 8 is illustrated in a flowchart of FIG. 11, instead of the flowchart of FIG. 9. FIG. 11 is a flowchart according to the second embodiment, illustrating an example of the process flow of the scan setting at SP14 of FIG. 8. FIG. 11 corresponds to the flowchart of FIG. 9. The order of the following acts can be changed as appropriate.

(SP34)

The determination circuit 36 determines whether or not at least any of the conditions with the condition IDs "1" to "6" of the first condition is satisfied. When the determination result is positive, the process proceeds to SP36. When the determination result is negative, the process proceeds to SP38.

(SP36)

The setting circuit 30 resets the scan time Ta, which is the touch execution period, to make it shorter than the reference. Then, the setting circuit 30 ends the scan setting.

(SP38)

The determination circuit 36 determines whether or not at least any of the conditions with the condition IDs "7" and "8" of the second condition is satisfied. When the determination result is positive, the process proceeds to SP40. When the determination result is negative, the determination circuit 36 ends the scan setting without resetting it.

(SP40)

The setting circuit 30 resets the scan time Ta, which is the touch execution period, to make it longer than the reference and then ends the scan setting.

Advantageous Effects

In the second embodiment as well, the electronic device 12 includes the capacitance-type touch sensor 18, which includes the plurality of sensor electrodes 18x and 18y disposed in a planar manner, and the touch IC 20, which is connected to the touch sensor 18. The touch IC 20 according to the second embodiment includes the setting circuit 30, which sets the scan time Ta, which is the touch execution period, as the scan condition, and the detection circuit 32, which detects the touch state by executing the scan process in the set scan time Ta. When the determination condition indicating the situation in which the scan time Ta is required to be changed is satisfied, the setting circuit 30 changes and resets the scan time Ta. The detection circuit 32 detects the touch state in the reset scan time Ta.

A touch state detection method for detecting the touch state of the user in the touch IC 20 according to the second embodiment includes a setting of setting the scan time Ta, which is the touch execution period, (SP14) and a detection of detecting the touch state by executing the scan process in the set scan time Ta (SP16 to SP24). The setting and the detection are sequentially and repetitively performed. When the determination condition is satisfied, the setting includes changing and resetting the scan time Ta, and the detection includes detecting the touch state in the reset scan time Ta.

With the touch IC 20, the electronic device 12, and the touch state detection method according to the second embodiment, the scan time Ta is changed and reset when the determination condition is satisfied. Therefore, the scan time Ta can be changed according to, for example, the detection target or the detection range. As a result, as in the first embodiment, compared to the case where the scan time Ta is fixed, detection suitable for various conditions can be performed.

When the first condition is satisfied as the determination condition, the setting circuit 30 changes and resets the scan time Ta to make it shorter than the reference. The first condition indicates at least any of the conditions with the condition IDs "1" to "6" illustrated in FIG. 10.

With this configuration, the scan time Ta can be shortened according to the situation in which at least any of the conditions with the condition IDs "1" to "6" is satisfied. In particular, in the condition with the condition ID "1," the threshold value is set to 5 fingers, which is the number of fingers F of one hand of the user. Accordingly, the scan time Ta can be optimized distinctively from a touch by both hands.

When the second condition is satisfied as the determination condition, the setting circuit 30 changes and resets the scan time Ta to make it longer than the reference. The second condition indicates at least any of the conditions with the condition IDs "7" and "8" illustrated in FIG. 10.

With this configuration, the scan time Ta can be lengthened according to the situation in which at least any of the conditions with the condition IDs "7" and "8" is satisfied.

Modifications

The present disclosure is not limited to the embodiments described above. That is, design modifications made to the above-described embodiments by those skilled in the art as appropriate also fall within the scope of the present disclosure as long as the modifications have the features of the present disclosure. In addition, the elements included in the embodiments described above and modifications to be described later can be combined as long as such combinations are technically possible, and such combinations also fall within the scope of the present disclosure as long as the combinations have the features of the present disclosure.

For example, in the example described in the first embodiment, both the length of the code multiplexed signal and the specified time are changed in order to achieve the reset scan rate. However, the present disclosure is not limited thereto. For example, either one of the length of the code multiplexed signal and the specified time may be changed, or another element may be changed. Further, in the example described above, the scan rate is reset by changing the specified time set as the scan time Ta. However, the scan rate may be reset by changing, for example, the specified time set as the integrated scan time Tb, without limiting to the scan time Ta.

In the second embodiment, the scan time Ta has been described as the scan condition related to the touch execution period. However, the integrated scan time Tb may be used as the scan condition related to the touch execution period.

The scan condition is not limited to control parameters focusing only on the touch detection and may also be a condition related to control parameters focusing on time-division detection of the pen state and the touch state. For example, the scan condition may be a ratio of the execution frequency of the scan process for detecting the touch state to the execution frequency of the scan process for detecting the pen state (hereinafter referred to as a "ratio of the scan execution frequency"). In other words, the setting circuit may change and reset the ratio of the scan execution frequency when the determination condition is satisfied.

Figure 12A:
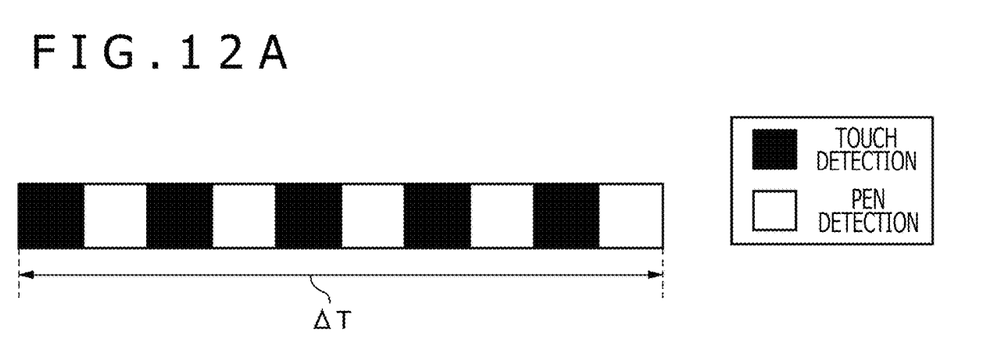
FIGS. 12A and 12B are diagrams for conceptually describing a ratio of a scan execution frequency.
Figure 12B:
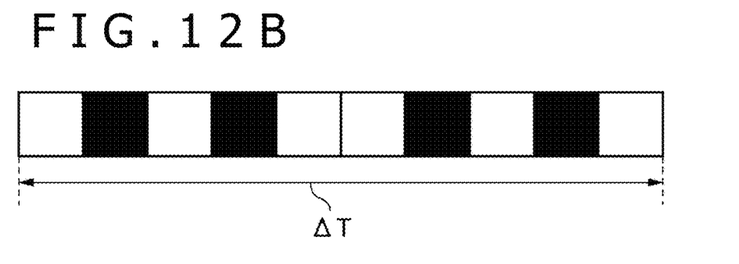

FIGS. 12A and 12B are diagrams for conceptually describing the ratio of the scan execution frequency. In FIGS. 12A and 12B, among 10 scan processes executed in a certain period of time ΔT, each scan process in the touch detection is indicated by a black square, and each scan process in the pen detection is indicated by a white square. FIGS. 12A and 12B thus conceptually illustrate the ratio between the number of scan executions in the pen detection and the number of scan executions in the touch detection during a predetermined number of times. FIG. 12A illustrates the case where the ratio of the scan execution frequency (pen detection:touch detection) is 5:5, while FIG. 12B illustrates the case where the ratio of the scan execution frequency (pen detection:touch detection) is 6:4. The setting circuit 30 changes the ratio of the scan execution frequency from 5:5 illustrated in FIG. 12A to 6:4 illustrated in FIG. 12B, for example. By changing the ratio of the scan execution frequency in this way, for example, the number of scan executions in the certain period of time ΔT can be changed even if the scan time Ta taken for one scan process is fixed.

In other words, even if the execution frequency of the scan process in the touch detection is fixed, the overall execution frequency of the entire scan process including the scan process in the pen detection and the scan process in the touch detection can be changed. As a result, detection suitable for various conditions can be performed.

The scan condition is not limited to any one of the scan rate, the touch execution period, and the ratio of the scan execution frequency and may be a combination thereof. That is, when the determination condition is satisfied, the setting circuit 30 may change and reset the scan condition that is any combination of the scan rate, the touch execution period, and the ratio of the scan execution frequency without limiting to changing and resetting the scan condition that is any one of them.

An embodiment of the present disclosure may be a program for causing the touch IC 20 and an information processing device such as the electronic device 12 to function as each of the functional configurations illustrated in FIG. 3. The program may be stored in a storage section disposed in, for example, the touch IC 20 or the electronic device 12 or may be stored in an external storage section connected to, for example, the touch IC 20 or the electronic device 12 over a network. Further, the program may be provided by being recorded on a computer-readable recording medium or provided through installation over a network such as the Internet.

What is claimed is:

1. A touch state detection circuit which is connected to a capacitance-type touch sensor including a plurality of sensor electrodes disposed in a planar manner and which detects a touch state of a user by executing a scan process that reads out and processes detection signals sequentially output from the sensor electrodes, the touch state detection circuit comprising:
a setting circuit which, in operation, sets a scan condition related to an execution frequency of the scan process or an execution period of the scan process; and
a detection circuit which, in operation, detects the touch state by executing the scan process under the scan condition set by the setting circuit,
wherein, when a determination condition indicating a situation in which the scan condition is required to be changed is satisfied, the setting circuit changes and resets the scan condition, and the detection circuit detects the touch state under the scan condition reset by the setting circuit, and
wherein, when a first condition is satisfied as the determination condition, the setting circuit changes and resets the scan condition such that the execution frequency becomes higher than a reference execution frequency or the execution period becomes shorter than a reference execution period.

2. The touch state detection circuit according to claim 1, wherein the first condition at least indicates that a number of fingers of the user is equal to or less than a threshold value when the touch state of one or more fingers of the user has been detected.

3. The touch state detection circuit according to claim 2, wherein the threshold value is the number of fingers of one hand of the user.

4. The touch state detection circuit according to claim 1, wherein the first condition at least indicates that the touch state of a palm of the user has been detected.

5. The touch state detection circuit according to claim 1, wherein the first condition at least indicates that a moving speed of a finger of the user is equal to or less than a threshold value when the touch state of the finger has been detected.

6. The touch state detection circuit according to claim 1, wherein the first condition at least indicates that a size of the touch sensor is equal to or less than a threshold value.

7. The touch state detection circuit according to claim 1, wherein the first condition at least indicates that a refresh rate of a display panel is higher than a threshold value and the touch sensor is superimposed on the display panel.

8. The touch state detection circuit according to claim 1, wherein the first condition at least indicates that there is a partial region that the user has no intention to touch within an entire region in which the touch state is detectable by the touch sensor.

9. The touch state detection circuit according to claim 1, wherein, when a second condition is satisfied as the determination condition, the setting circuit changes and resets the scan condition such that the execution frequency becomes lower than a reference execution frequency or the execution period becomes longer than a reference execution period.

10. The touch state detection circuit according to claim 9, wherein the second condition at least indicates that a number of fingers of the user is equal to or greater than a threshold value when the touch state of one or more fingers of the user has been detected.

11. The touch state detection circuit according to claim 9,
wherein the scan process is executed to further detect a pen state of an electronic pen, and
wherein the second condition at least indicates that a non-use state of the electronic pen has been detected.

12. The touch state detection circuit according to claim 1,
wherein the scan process is executed to detect a pen state of an electronic pen and the touch state in a time-division manner,
wherein the scan condition indicates a ratio of the execution frequency of the scan process for detecting the touch state to the execution frequency of the scan process for detecting the pen state, and,
wherein, when the determination condition is satisfied, the setting circuit changes and resets the ratio.

13. An electronic device comprising:
a capacitance-type touch sensor including a plurality of sensor electrodes disposed in a planar manner; and
a touch state detection circuit which is connected to the touch sensor and which detects a touch state of a user by executing a scan process that reads out and processes detection signals sequentially output from the sensor electrodes, the touch state detection circuit including:
a setting circuit which, in operation, sets a scan condition related to an execution frequency of the scan process or an execution period of the scan process, and
a detection circuit which, in operation, detects the touch state by executing the scan process under the scan condition set by the setting circuit,
wherein, when a determination condition indicating a situation in which the scan condition is required to be changed is satisfied, the setting circuit changes and resets the scan condition, and the detection circuit detects the touch state under the scan condition reset by the setting circuit, and
wherein, when a first condition is satisfied as the determination condition, the setting circuit changes and resets the scan condition such that the execution frequency becomes higher than a reference execution frequency or the execution period becomes shorter than a reference execution period.

14. A touch state detection method performed by a touch state detection circuit which is connected to a capacitance-type touch sensor including a plurality of sensor electrodes disposed in a planar manner and which detects a touch state of a user by executing a scan process that reads out and processes detection signals sequentially output from the sensor electrodes, the touch state detection method comprising:
setting a scan condition related to an execution frequency of the scan process or an execution period of the scan process; and
detecting the touch state by executing the scan process under the scan condition set by the setting,
wherein the setting and the detecting are sequentially and repetitively performed,
wherein, when a determination condition indicating a situation in which the scan condition is required to be changed is satisfied, the setting includes changing and resetting the scan condition, and the detecting includes detecting the touch state under the scan condition reset by the setting, and
wherein, when a first condition is satisfied as the determination condition, the setting includes changing and resetting the scan condition such that the execution frequency becomes higher than a reference execution frequency or the execution period becomes shorter than a reference execution period.

* * * * *